(12) United States Patent
Anderson (10) Patent No.: US 6,593,670 B2
(45) Date of Patent: Jul. 15, 2003

(54) AUTOMATIC TRANSFER SWITCH AND ENGINE CONTROL

(76) Inventor: William J. Anderson, 1335 Pine St., Glenview, IL (US) 60025

( * ) Notice: Subject to any disclaimer, the term of this patent is extended or adjusted under 35 U.S.C. 154(b) by 0 days.

(21) Appl. No.: 09/748,572

(22) Filed: Dec. 22, 2000

(65) Prior Publication Data

US 2002/0079741 A1 Jun. 27, 2002

(51) Int. Cl.⁷ .................................................. H02J 7/00
(52) U.S. Cl. ............................................. 307/64; 307/85
(58) Field of Search ............................... 307/64, 68, 78, 307/85

(56) References Cited

U.S. PATENT DOCUMENTS

| | | | | |
|---|---|---|---|---|
| 4,423,336 A | * | 12/1983 | Iverson et al. ................ 307/64 |
| 5,031,593 A | * | 7/1991 | Erhard et al. ................ 123/331 |
| 5,611,312 A | * | 3/1997 | Swanson et al. ....... 123/179.18 |
| 5,755,211 A | * | 5/1998 | Koch ......................... 123/525 |
| 5,874,698 A | * | 2/1999 | Collis ....................... 200/50.33 |
| 6,105,553 A | * | 8/2000 | Polach ........................ 123/435 |
| 6,172,432 B1 | * | 1/2001 | Schnackenberg et al. ... 307/125 |
| 6,181,028 B1 | * | 1/2001 | Kern et al. .................. 307/64 |

* cited by examiner

*Primary Examiner*—Brian Sircus
*Assistant Examiner*—Sharon A. Polk (57) ABSTRACT

An Automatic Transfer Switch (ATS) providing automatic transfer of loads from utility power to generator power upon detection of utility power failure. The ATS comprises a pair of molded case circuit breakers, a servo motor operating the breakers through an actuator that also functions as a mechanical interlock to prevent both breakers from being on simultaneously, AC voltage sensors monitoring utility, generator and load voltages and a microcontroller providing overall system control. Included with the ATS is an engine control unit that communicates over a serial communication link with the ATS. The engine control unit comprises engine function relays, starter contactor, battery charger and a microcontroller providing overall control and communication with the ATS. The engine control also includes a mechanical choke operator.

14 Claims, 12 Drawing Sheets

AUTOMATIC TRANSFER SWITCH AND ENGINE CONTROL

BACKGROUND OF THE INVENTION

Engine-powered generators are commonly used as standby AC power generation equipment for residences and businesses in order to provide power when utility power fails. Transfer switches are commonly used as the means of connecting the generator to the building AC wiring.

Two types of transfer switches are available, manual and automatic.

Manual transfer switches rely on a human operator to operate the switch. When power fails, the operator must start the generator and then throw switches on the manual transfer switch to transfer selected loads from utility power to generator power. When utility power is restored, the operator reverses this process, shutting down the generator and throwing switches on the transfer switch to reconnect the loads to utility power. Manual transfer switches are inexpensive, but require a human operator to be present. Emergency situations commonly occur when a human operator is not present.

Automatic transfer switches have internal logic which can detect utility power failure, signal a generator to start, and then transfer the load from the utility to the generator, reversing this process when the utility power is restored.

Automatic transfer switches (ATS) currently available provide a RUN signal to an external engine controller. The engine controller has the responsibility to start and stop the generator (based on the RUN signal from the ATS). Some engine controllers also provide extra inputs for alarm signals from the generator such as low oil pressure and high temperature. The engine controller may take some action based on these inputs, but there is no communication of what has occurred back to the ATS. Any visual indications of a problem are only available at the engine controller, which is mounted in the vicinity of the generator, normally outside the building.

Engine controllers typically include only a low current relay output for the engine starter that can only handle a few amps, so an external contactor must be obtained and connected to the engine starter and battery to provide the capability of switching the 100 amps or so required by the engine starter motor.

Engine controllers normally provide a relay contact to operate the engine choke. This is fine for engines having an electrically-operated choke. Unfortunately most small portable (less than 13,000 watts) generators have mechanically-operated chokes.

ATS units are typically available in sizes from 100 amps on up. Residences and small businesses typically need a generator in the range of 50 amps maximum, so ATS units having larger maximum capabilities are not necessary for these uses and incorporate larger associated costs.

Engine controllers may include a battery charger function, but the battery status is not communicated back to the ATS, and if any visual indication of battery status is available, it is only available at the engine controller location (normally outside the building).

SUMMARY OF THE INVENTION

The present invention aims to solve the problems mentioned above that exist with currently available ATS and engine controllers.

At the heart of the ATS is a pair of double-pole switch/circuit breakers (switches) operated by a servo motor. The switching elements can be either a simple switch or a combined switch/circuit breaker. The addition of the circuit breaker function provides additional protection for both the generator and its wiring as well as for the loads connected to the switch. One side of each double-pole switch is connected to an electrical supply source, such as a utility or a generator. The other side of each switch is connected in common to a load subpanel or manual transfer switch. The load subpanel or manual transfer switch is in turn connected to selected loads.

An actuator mounted on the servo motor serves both to operate the switches and to function as an interlock to prevent both switches from being on simultaneously, thus causing a line-to-line short circuit. The stacked combination of the switches forms the function of a double pole double throw switch. The servo motor operator can then be electrically activated to move the operating handles to one side or the other, thus turning one double pole switch/breaker OFF while simultaneously turning the other double pole switch/breaker ON. The actuator works in such a way that the switch going to the OFF position opens before the other switch goes ON, thus ensuring a "break-before-make" operation, preventing any short-circuiting of the utility and generator voltages. The servo motor mechanism allows the switch to be operated manually without damaging the servo motor, while the actuator prevents both switches from being on simultaneously even when operated manually.

The ATS also includes a logic section to control its operation and to communicate with the engine controller. The logic section controls the servo motor, detects the presence or absence of AC voltage from the utility, from the generator, and to the load. It also detects the physical position of the two double pole switch/breakers via auxiliary switches mechanically tied to the switch/breaker operators, since manual operation or tripping of the circuit breaker function may move the switch to a different status than is thought to be true by the logic section or a welded switch contact may prevent the switch from being turned off. The logic section is setup to monitor its various inputs and then take appropriate action based on the state of these inputs.

A power supply is included in the ATS. The power supply provides power to the logic section, engine controller, and also for a battery charger function included as part of the engine controller.

The ATS incorporates bi-directional communication with the engine controller. This allows not only sending a RUN signal to the engine controller as is done with currently available ATS units, but also sending and receiving other information between the ATS and engine controller. Such things as battery status can be communicated, allowing the ATS to visually display battery status at the ATS location. The ATS can also tell the engine controller when the ATS detects AC voltage on the generator output. The engine controller can then stop cranking the engine starter. The ATS and engine controller can also detect when the communication link is broken, and provide a visual indication to the operator of this fact.

Since the ATS function is servo motor operated, the motor can be stopped at any position of its travel. This allows pausing the switch movement at a point when the switch supplying the load opens. The logic section can then monitor presence of voltage on the load, and resume servo motor operation to move the switch to the opposite position when voltage below a set threshold is no longer detected. This prevents switching a load such as a still-spinning motor to a supply where the motor's self-generated voltage may be out of phase with the utility or generator-supplied voltage, resulting in a large, possibly damaging current surge. Also, when the servo motor moves the switches through the position where both are OFF, the logic section can monitor the auxiliary switches to be sure that the switch/circuit breaker that was ON truly goes off. If the auxiliary switch would still indicate that the OFF switch was on, the logic section would stop further movement of the servo motor to prevent a line-to-line short.

Since the servo motor is not damaged by manual operation of its shaft, the ATS may be manually operated. This provides a measure of operational redundancy in that if the automatic operation of the ATS or engine controller fails, the operator can still start the generator manually and switch the load to the generator manually.

At the heart of the engine controller is a microcontroller-based logic section. This logic section communicates with the logic section of the ATS. The engine controller includes electrical relay outputs to control the engine ignition, electrically-operated choke, fuel/gas valve and glow plug relay. A starter contactor provides for direct control of the engine starter motor without the need for an external contactor.

The engine controller includes a mechanical actuator for a mechanical choke. This actuator includes a mechanical linkage allowing easy connection to most small generator choke operators.

The engine controller also includes a battery charger function. Battery terminal voltage and ambient temperature are detected, and charging current and voltage are adjusted accordingly in order to match the charging specifications of the battery. Battery status is reported back to the ATS. Battery charging is inhibited if the battery is fully charged or has a terminal voltage below a set threshold.

DESCRIPTION OF THE DRAWINGS

FIG. 1 Overall System Diagram
FIG. 2 Engine Controller with Cover Removed
FIG. 3 Transfer Switch
FIG. 4 Engine Controller Detail
FIG. 5 Transfer Switch Logic Detail
FIG. 6 Switch Element Detail
FIG. 7 Engine Controller Schematic
FIG. 8 Transfer Switch Schematic

GENERAL SYSTEM DESCRIPTION

Figure 1:
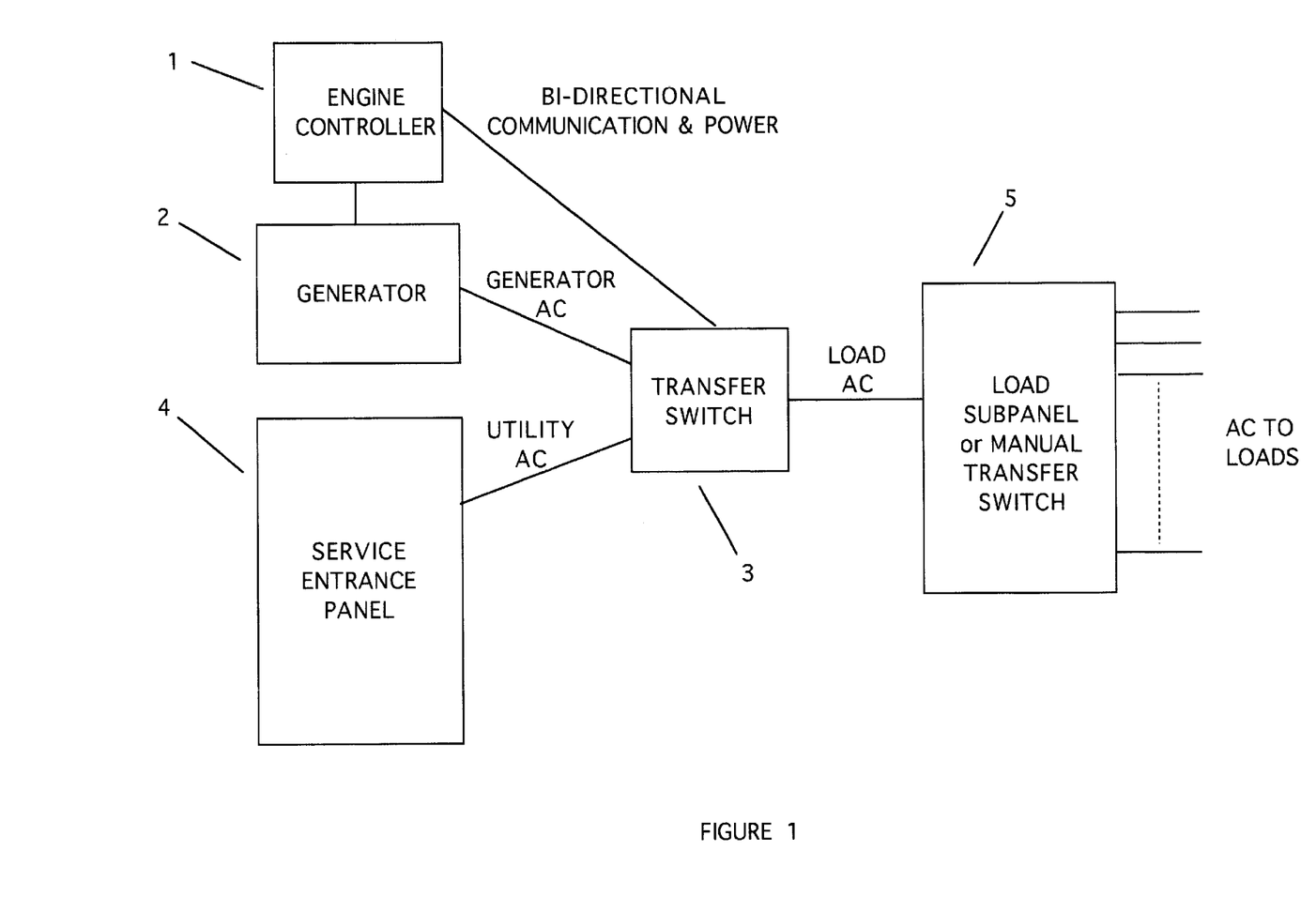

Referring to FIG. 1, engine controller 1 is connected electrically and mechanically to generator 2 and electrically to automatic transfer switch 3. Automatic transfer switch 3 is connected to the voltage output of generator 2, to utility power through circuit breakers in service entrance panel 4 and to emergency load panel or manual transfer switch 5.

Figure 2:
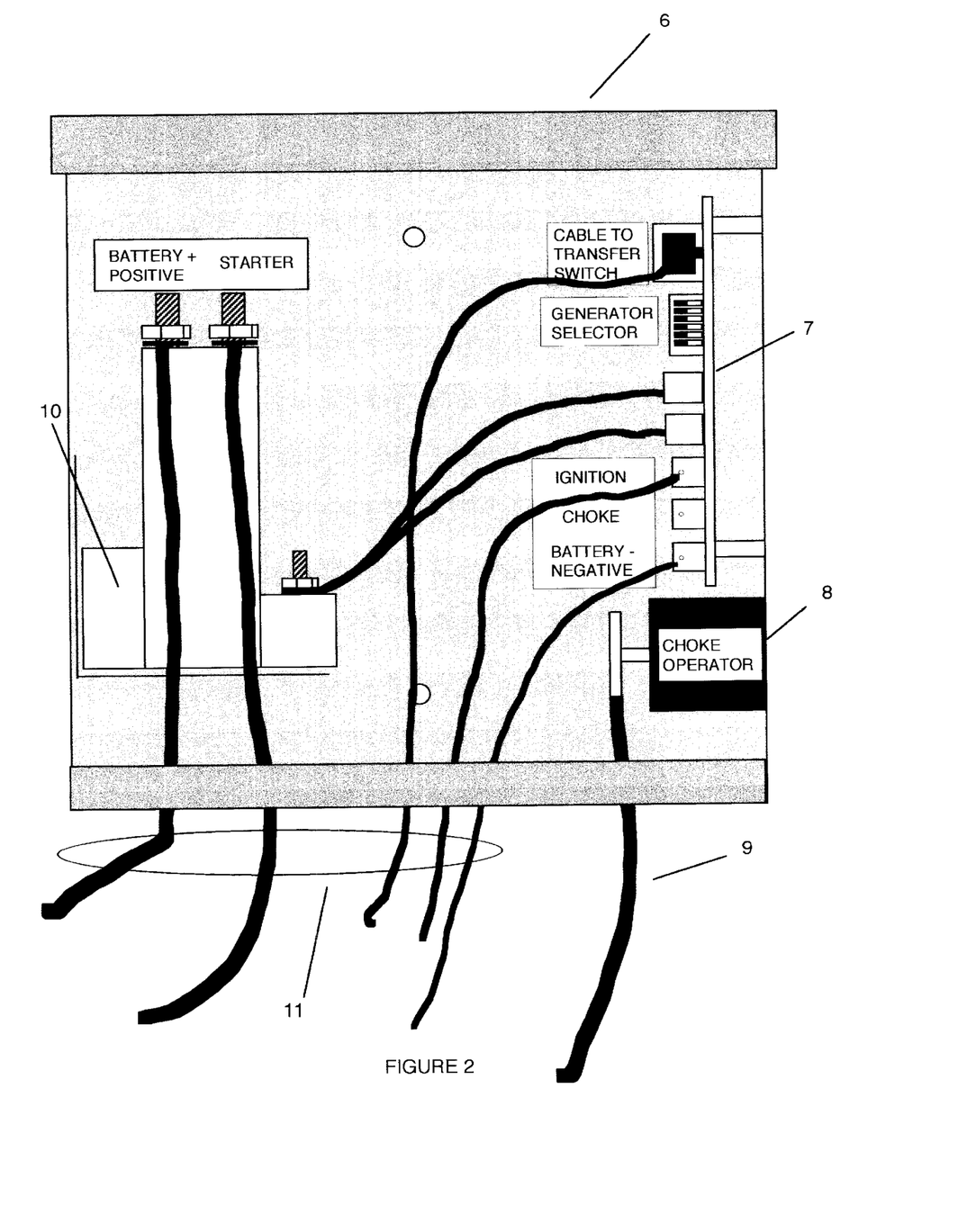

Referring to FIG. 2, the engine controller consists of enclosure 6, logic board 7, choke operator 8, choke linkage 9, starter contactor 10 and wiring 11.

Figure 3A:
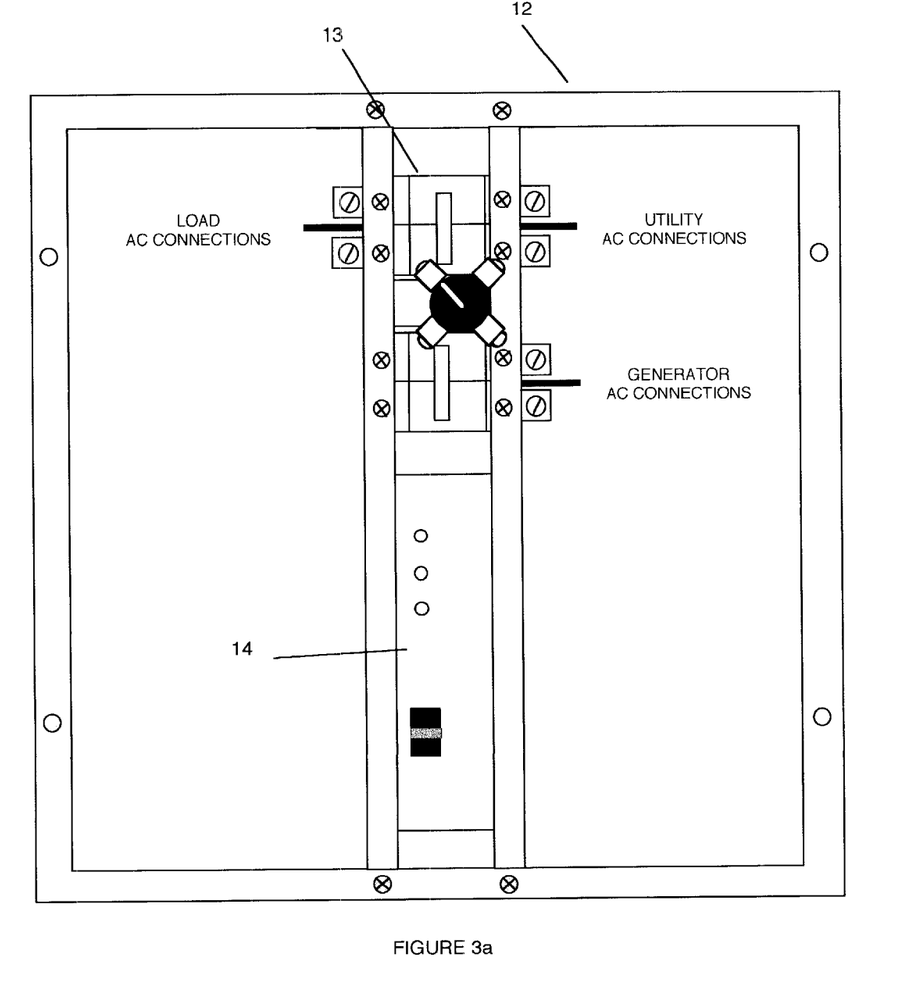
Figure 3B:
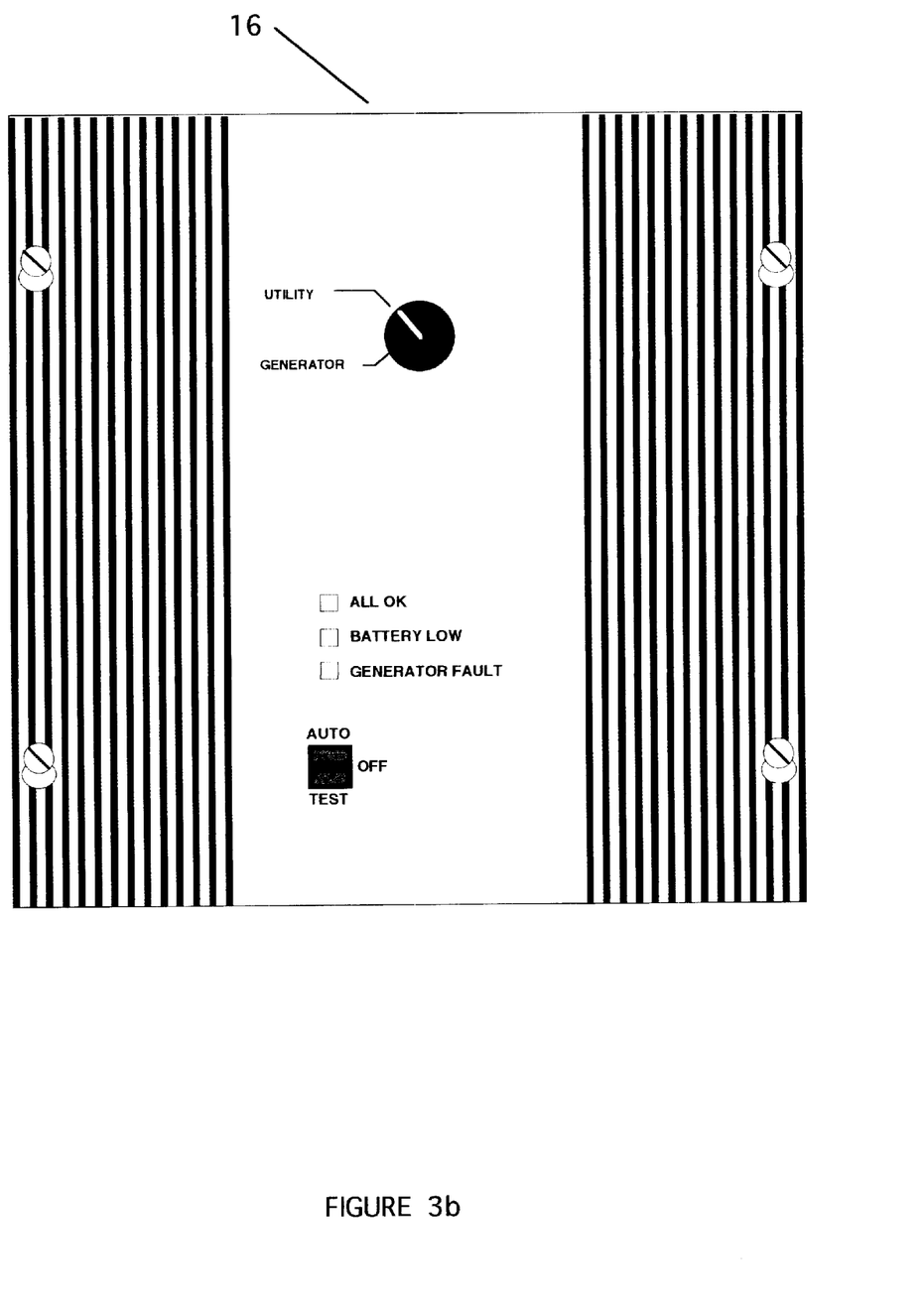

Referring to FIG. 3a and 3b, the transfer switch 3 consists of enclosure 12, motor-operated switch/breaker 13, logic board/power supply 14 and front panel 16.

Figure 4A:
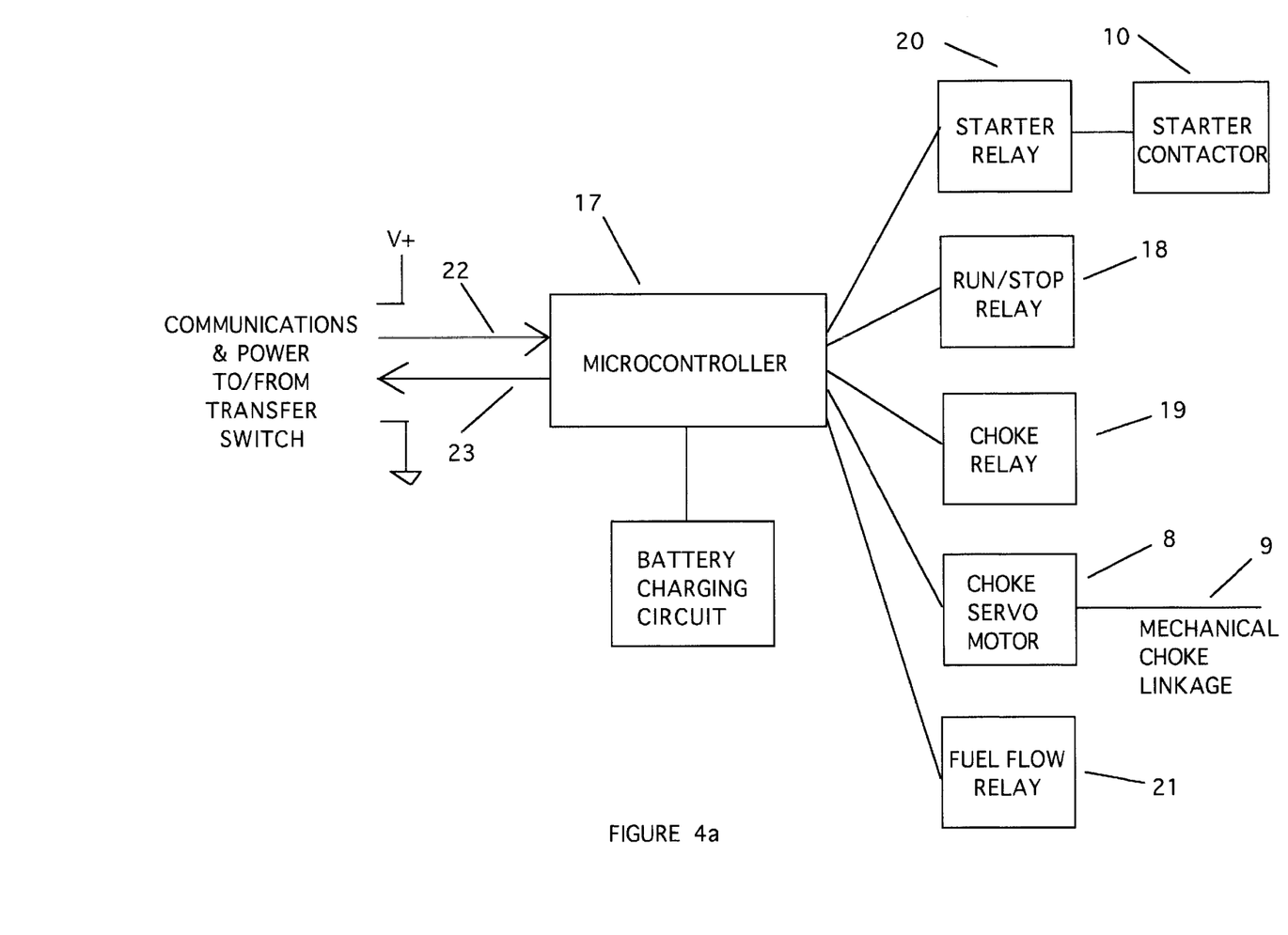
Figure 4B:
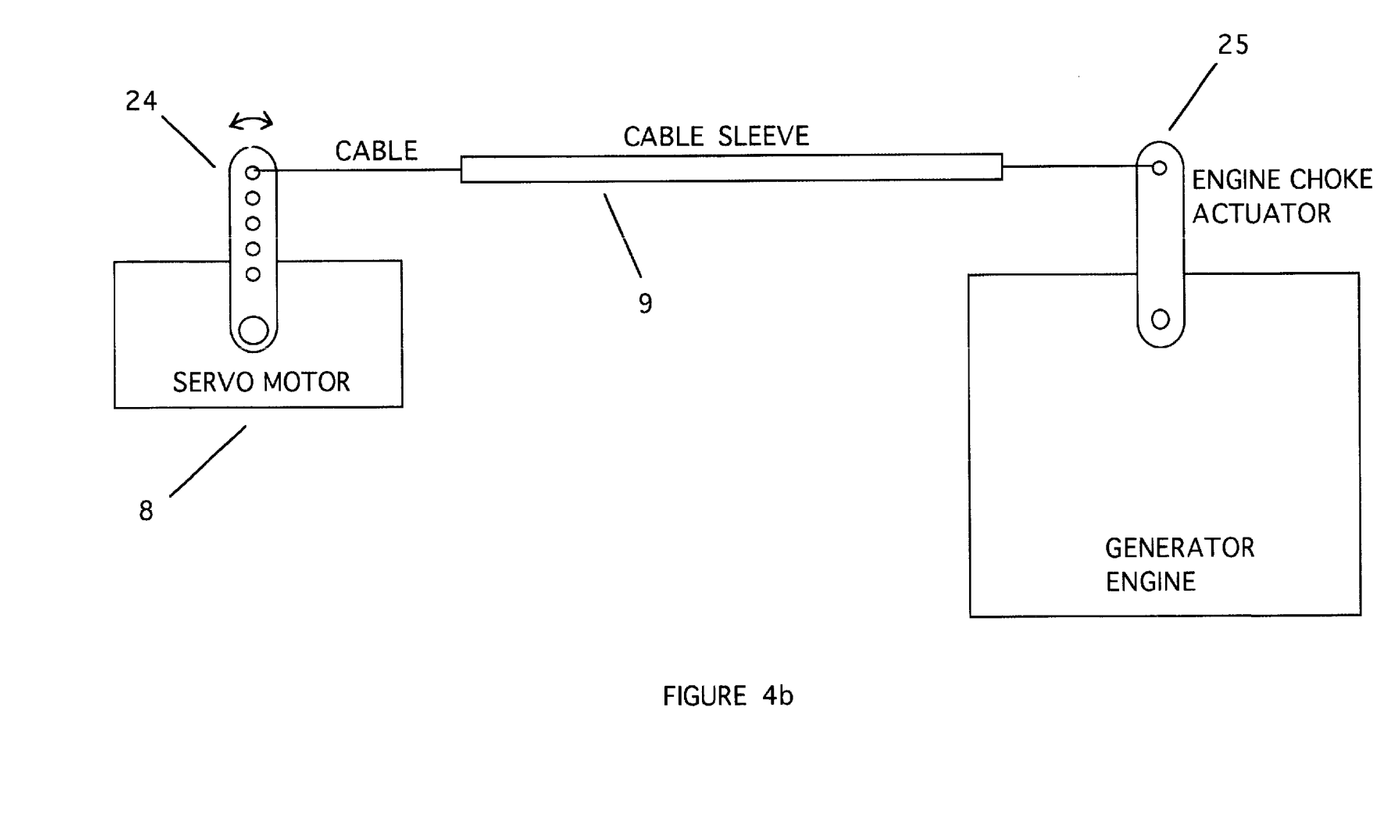

FIGS. 4a and 4b examine the engine controller in greater detail. Microcontroller 17 is connected to relays 18, 19 and 21 which in turn are connected to engine connections for ignition, fuel flow and electrical choke or glow plug. Microcontroller 17 is also connected to relay 20 which provides higher current to starter contactor 10, which in turn is connected to the engine starter motor. Communication lines 22 and 23 provide bidirectional connections to the transfer switch 3. Upon receipt of a command from the transfer switch 3 to RUN the generator 2, microcontroller 17 operates relays 18, 19 and 21 as needed for the type of engine being controlled (gasoline, diesel, LP/natural gas) and operates relay 20 which in turn operates contactor 10 to crank the generator engine starter. Once the engine has started, transfer switch 3 detects presence of AC voltage from the generator and communicates this fact over communication line 22 to microcontroller 17, which in turn ceases cranking the engine starter motor by turning off relay 20 which in turn turns off contactor 10, removing power from the starter motor.

For most generators which do not have electrically operated chokes, choke operator 8 and choke linkage 9 provide a mechanical means to actuate a choke. Choke operator 8 is a servo motor whose shaft can be rotated by electronic command from microcontroller 17. A pulse width modulated (PWM) signal from microcontroller 17 provides this electronic command to the servo motor 8. Variations in the pulse width cause the servo motor 8 to rotate to an angular position proportional to the pulse width. Referring to FIG. 4b, The shaft of the servo motor 8 has a servo horn 24 attached to it. The servo horn 24 in turn is connected to choke linkage 9, which in turn is connected to the engine choke actuator 25. The cable sleeve of choke linkage 9 is fastened to the generator engine. By varying the pulse width to the servo motor 8, microcontroller 17 can cause the engine choke actuator 25 to be positioned anywhere between fully open and fully closed.

Figure 5:
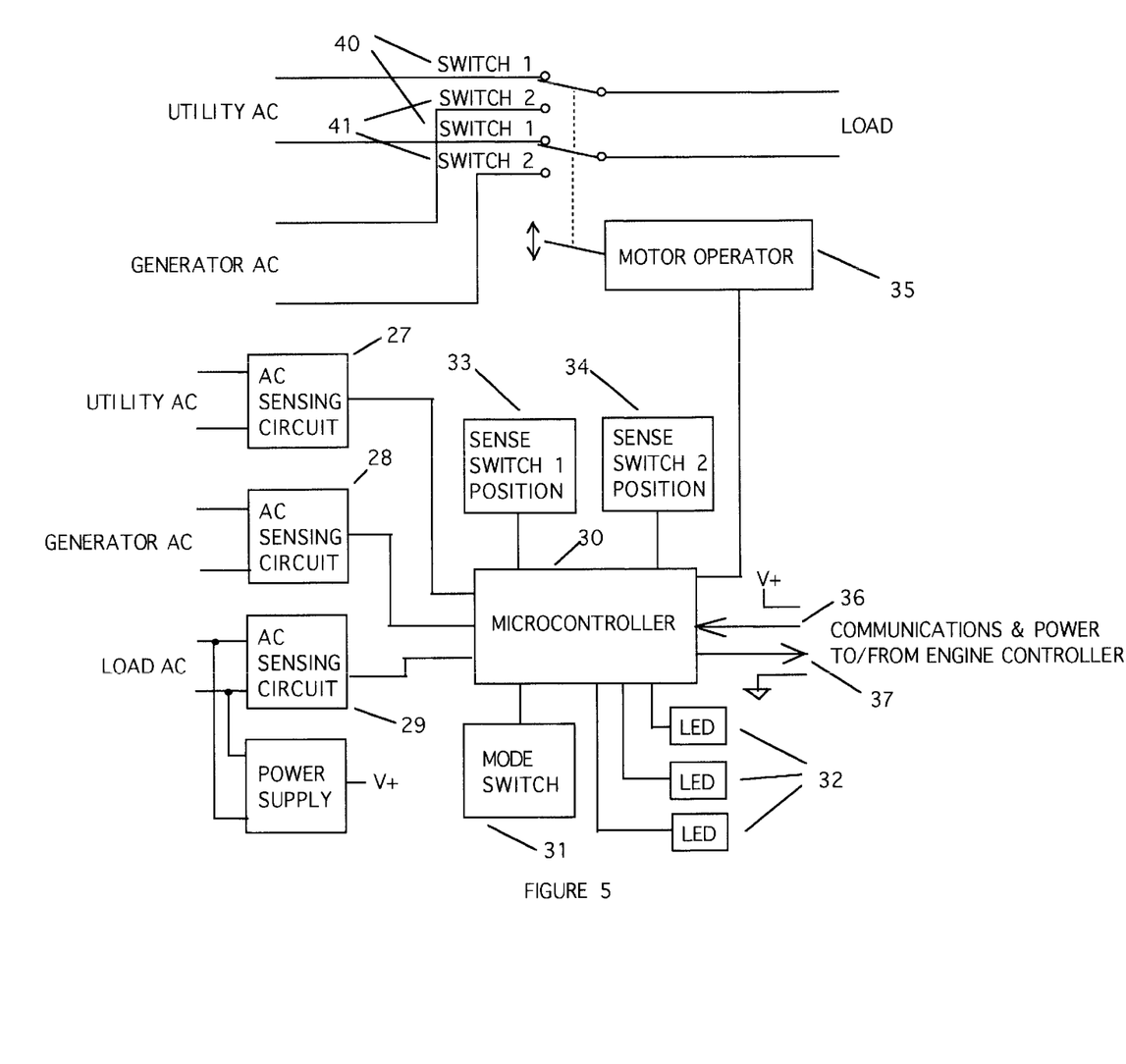

FIG. 5 examines the transfer switch logic section in greater detail. Three AC sensing circuits 27, 28 and 29 provide a logic low or high to their respective microcontroller 30 inputs based on the voltages on Utility AC, Generator AC and Load AC. Mode switch 31 provides a means for a human operator to change the operational state of the microcontroller 30. LEDs 32 provide a means of providing visual feedback to the operator from the microcontroller 30. Sense switch position circuits 33 and 34 provide a means for the microcontroller 30 to read the physical positions of switch 40 and switch 41. Motor operator 35 provides a means for the microcontroller to change the positions of switch 40 and switch 41, thus changing the connection of the load to either the utility connection or the generator connection or neither. Communication lines 36 and 37 provide bi-directional communication to the microcontroller 17 in the engine controller.

Figure 6:
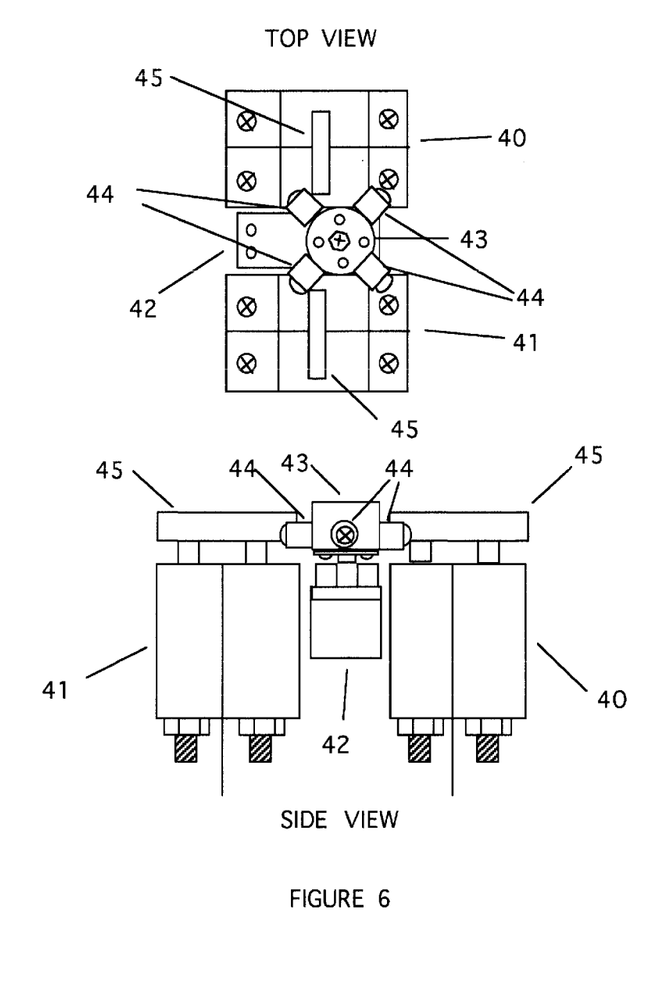

FIG. 6 examines the motor-operated switch/breaker 13 in greater detail. Switch 40 and switch 41 are standard double pole circuit breakers. Servo motor 42 is a standard servo motor whose shaft angular position is determined by the pulse width of the position signal to the motor. actuator 43 is rotated clockwise and counterclockwise by servo motor 42. The actuator arms 44 contact and then move the operating handles of switches 40 and 41. With switch 40 in the off position, as actuator 43 is operated clockwise, the arms 44 first move switch 41 to the off position. If microcontroller 30 senses through sense switch 33 and sense switch 34 that both switches 40 and 41 are in the off position, microcontroller 30 moves the servo motor 42 and thus actuator 43 to position switch 40 to the on position. This activity serves to disconnect the loads from the generator and connect them to the utility. This process is reversed to disconnect the loads from the utility and connect them to the generator. Microcontroller 30 can suspend further movement of switch 40 or 41 if it detects through sense switches 33 and 34 that switches 40 and/or 41 are not responding as they should to movement of their corresponding operating handles 45.

Schematic Details

Figure 8A:
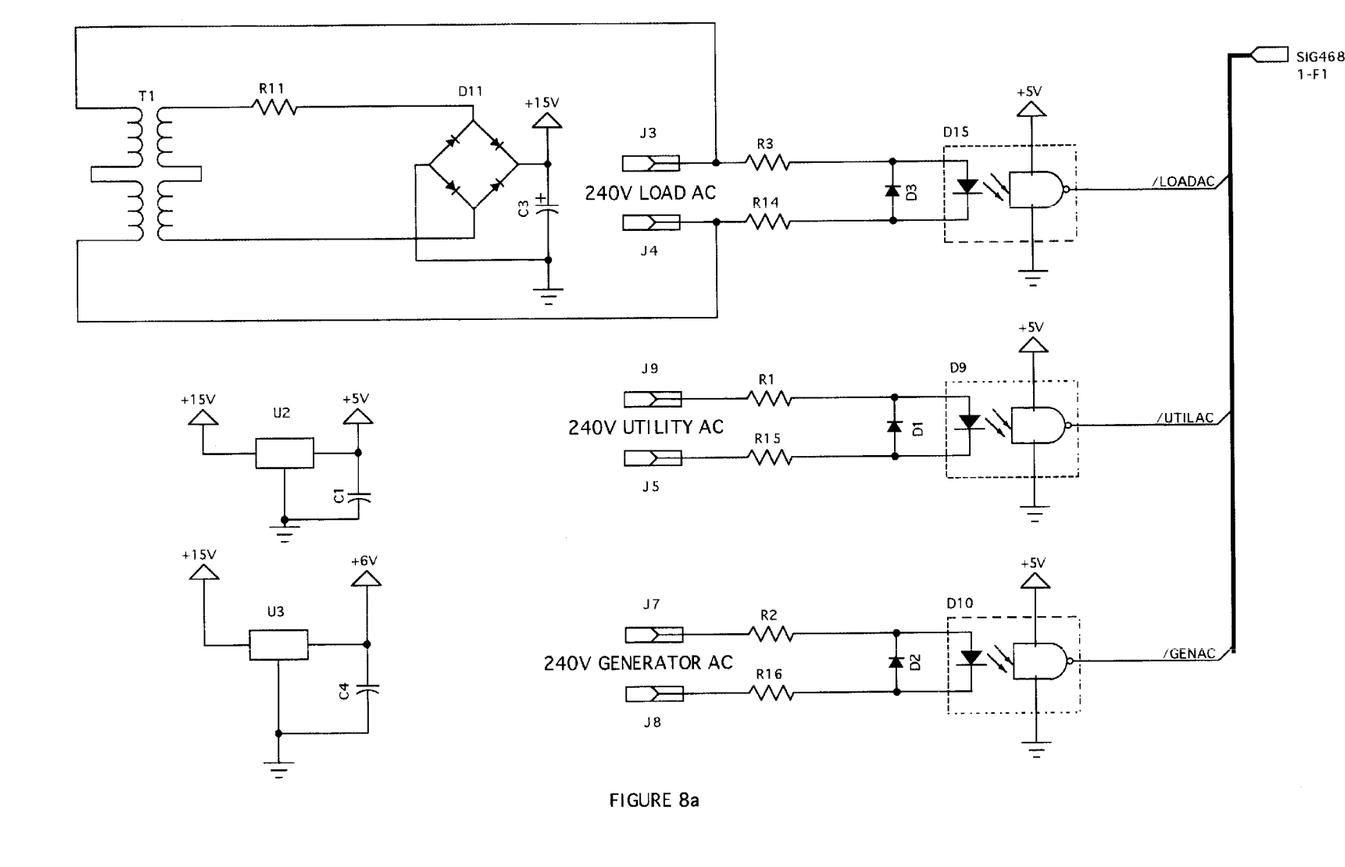

Referring to FIG. 8a, transformer T1, thermistor R11, rectifier bridge D11 and capacitor C3 form an unregulated power supply whose nominal output voltage is about 15 volts.

Resistors R3 & R14, diode D3, optocoupler D15 form an AC detection circuit. The optocoupler D15 LED is illuminated by current flowing from the 240 volts LOAD AC through limiting resistors R3 & R14. The output transistor in optocoupler D15 is turned on by the LED when the input current is sufficient to provide enough LED drive current. This turn-on point is adjustable by changing the value of R3 & R14. The AC detection circuit is duplicated in the circuit represented by R1, R15, D1, D9 as well as the circuit represented by R2, R16, D2 and D10. These three circuits are in turn connected to inputs of the microcontroller U1 (FIG. 8b) and provide detection capability for utility AC, load AC, and generator AC voltages.

J6 is connected to auxiliary switches mounted in switches 40 and 41 (FIG. 5). These inputs in turn are connected to microcontroller U1 to allow the microcontroller to sense the position of switch 40 and switch 41. R9 and R10 provide some protection against transients which may be picked up at switch 40 & 41.

Figure 8B:
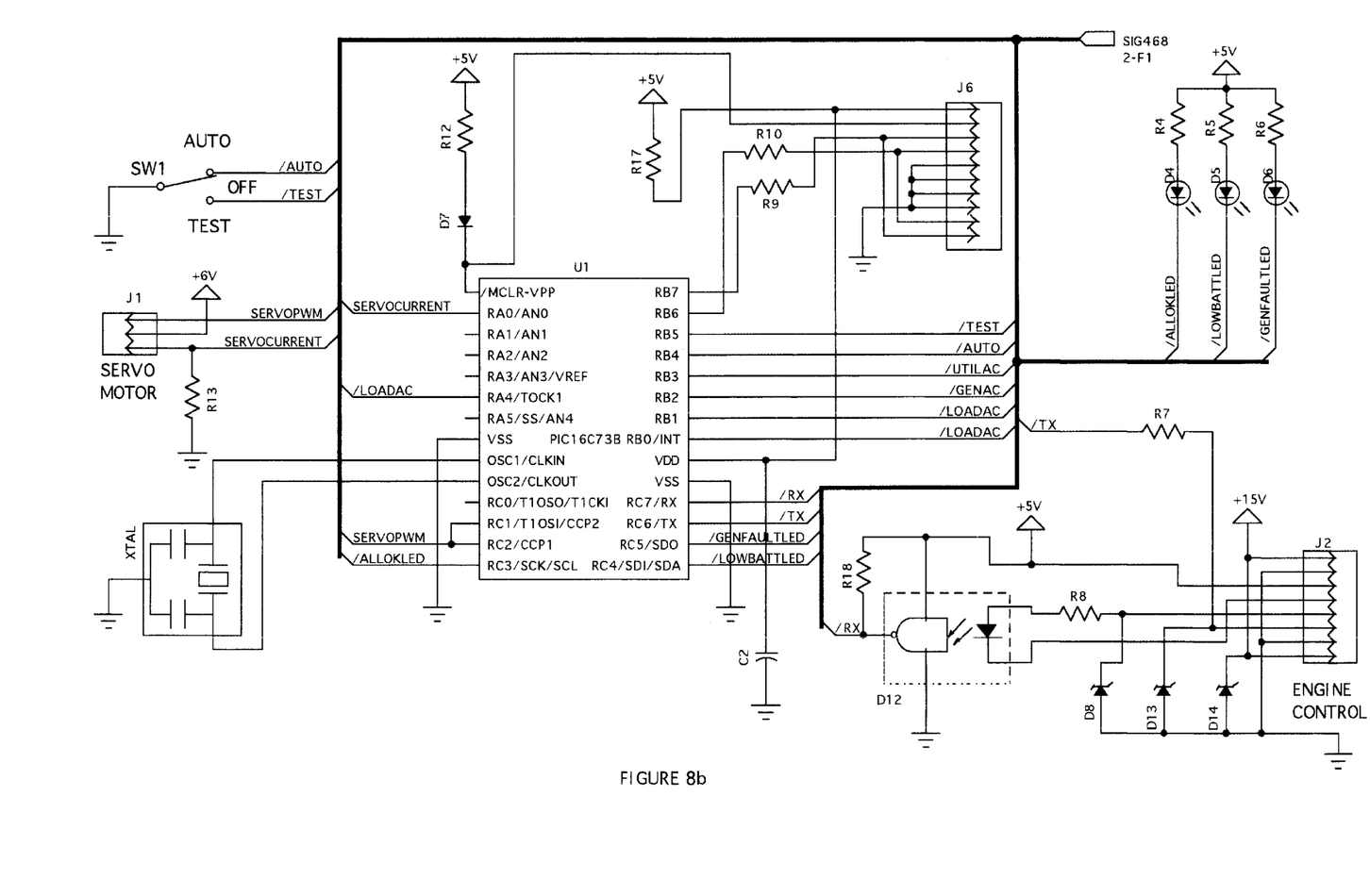

Referring to FIG. 8b (the transfer switch logic section), microcontroller U1 is connected to the motor operator of switch 40 and switch 41 via connector J1. The microcontroller U1 can cause the motor operator to change the state of switch 40 and switch 41.

A mode switch SW1 provides operator input to the microcontroller U1 to allow the operator to change the operating mode of the system.

LEDs D4, D5 and D6 are connected to microcontroller U1 outputs and provide feedback to the operator on system status.

J2 connects one output and one input of the microcontroller to the engine controller. D8, D13, R7, R8 and D14 provide some protection against transient voltages picked up from the engine controller wiring.

Referring to FIG. 8a, regulator U2 is connected to the unregulated 15 volt supply, and provides a regulated 5 volts for the microcontroller U1. Regulator U3 provides regulated 6 volts for the servo motor connected to J1.

Figure 7A:
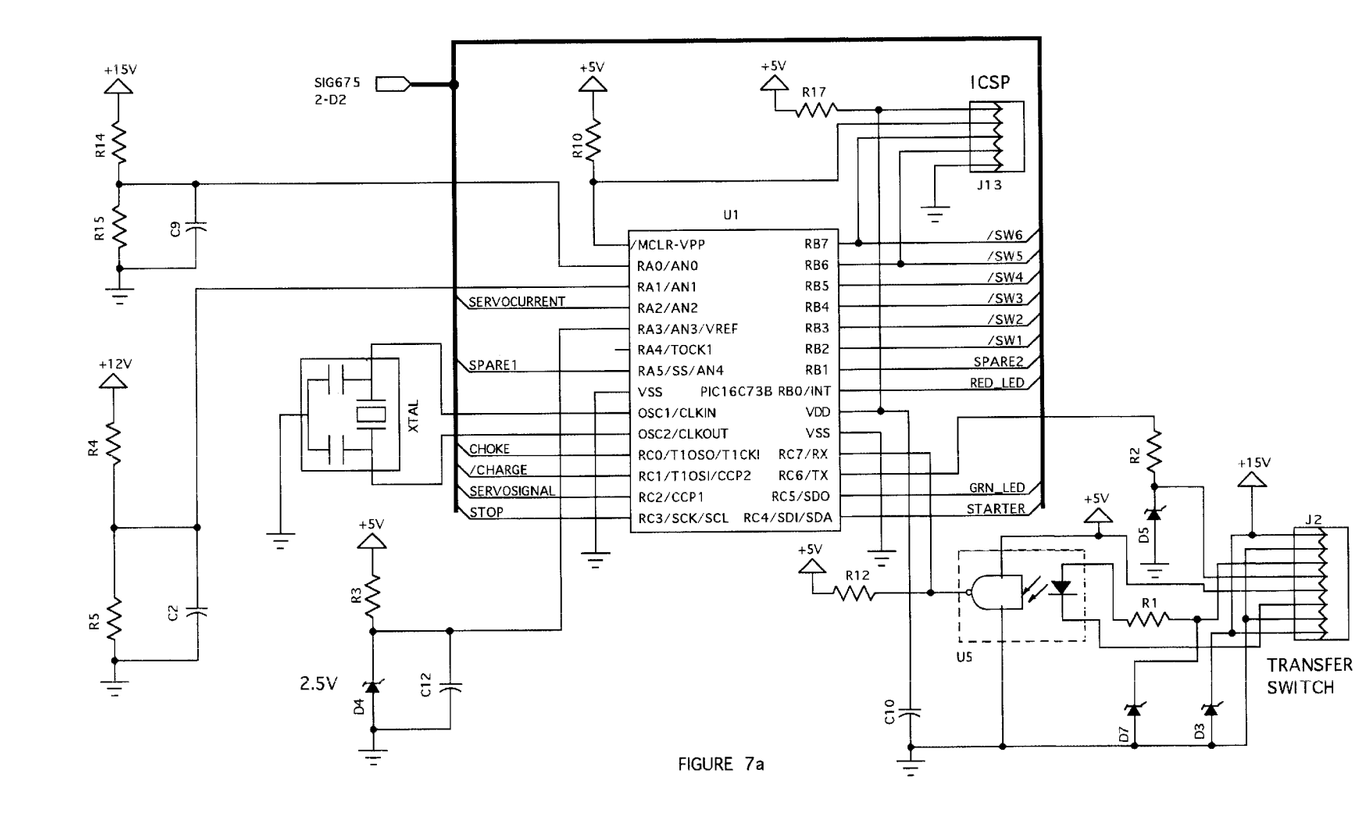

Referring to Fig, 7a, J2 connects one output and one input from microcontroller U1 to the transfer switch. D7, D3, D5, R1 and R2 provide some protection against transients picked up from the wiring to the transfer switch.

Resistor R4 and R5 form a voltage divider connected to the battery input 12 volts and to a microcontroller analog to digital converter input. Through this circuit the microcontroller can measure the battery terminal voltage and make decisions regarding the state of the battery.

Figure 7B:
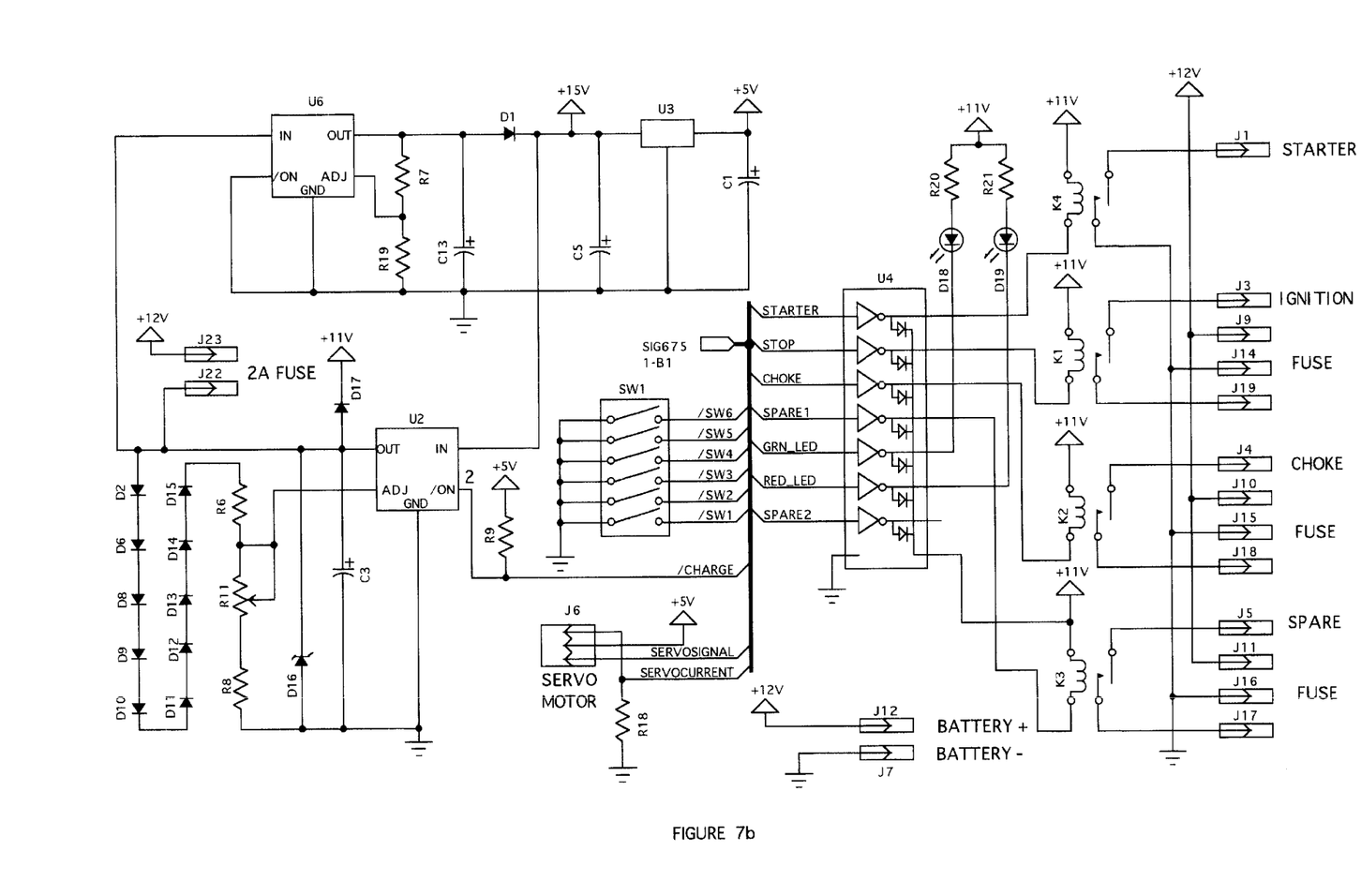

Referring to FIG. 7b, microcontroller U1 outputs are individually connected to relays K1, K2, K3 and K4 through driver IC U4. These relays in turn are connected to other system components such as the starter motor contactor, ignition circuit on the generator and the electrical choke on the generator through connectors J3, J4 and J5.

Switch SW1 is connected to 6 inputs of microcontroller U1 and provides a means to change the configuration of the system to account for things like operational variations of various generators.

Regulator U3 provides 5 volt regulated power for the microcontroller. Regulator D4 provides an accurate reference voltage for the analog-to-digital converter contained in microcontroller U1.

Regulator U2 provides a current limited constant voltage battery charging circuit. The voltage divider formed by R6, R8 and R11 diodes D2, D6 and D8–D15 sets the peak charging terminal voltage to the battery. Diodes D2, D6 and D8–D15 also provide temperature compensation of this voltage to match the 22 millivolts per degree Centigrade terminal voltage variation of the lead-acid battery. Microcontroller U1 controls regulator U2 by controlling U2's ON/OFF pin 2, thus setting the effective charging current to the engine battery by pulsing U2 pin 2 causing the output of U2 to pulse in a duty cycle selected by microcontroller U1. Regulator U6 serves to limit the available to the transfer switch from the engine battery in the event of a short circuit in the wiring between the transfer switch and the engine control.

J6 connects a pulse-width-modulated output from microcontroller U1 to the servo motor used as the choke operator. The servo motor changes its rotational position in response to changes in the pulse width, and thus the position of the generator choke actuator through the mechanical connecting linkage between the choke and the servo motor.

System Operation

The system has three operational modes set by the mode switch SW1. The modes are OFF, AUTO and TEST.

In the OFF mode the system operates as follows. Transfer switch microcontroller 30 communicates with engine controller microcontroller 17. The status of the generator battery is monitored by microcontroller 17 and communicated to microcontroller 30. If the battery status is not OK, meaning that the terminal voltage of the battery is below a threshold set in the program of the microcontroller 17, microcontroller 30 will illuminate an LED labeled "BATTERY LOW" on the transfer switch front panel. The GENERATOR FAULT and ALL OK LEDs are reset (turned off).

In the AUTO mode the system operates as follows. The ALL OK LED is illuminated. Transfer switch microcontroller 30 continuously monitors the status of the AC Sensing Circuits 27, 28 and 29. If utility power fails, microcontroller 30 will wait a set period of time (e.g. 10 seconds) to make sure that the power failure is not just a power "blink". Then if the microcontroller still senses utility power failure it will signal microcontroller 17 to start the generator.

Microcontroller 17 will set relays 18, 19, 21 and the choke servo motor (for mechanically operated chokes) to the optimum position for the system configuration that has been set at installation by using switch SW1 in the engine controller.

Microcontroller 17 will then turn on relay 20 which in turn turns on contactor 10 causing the generator starter motor to crank the engine. After 10 seconds of cranking, microcontroller 17 will turn off relay 20 causing the starter motor to stop. After 10 seconds microcontroller 17 will again cause the starter to crank the engine. When the engine starts, the generator will start generating AC voltage which is sensed by microcontroller 30 through AC sensing circuit 28. Microcontroller 30 then signals microcontroller 17 to stop cranking the engine, since it has started.

During starting the operation of the choke can be customized to various engine types. This is done by setting switch SW1 in the engine controller. The microcontroller examines switch SW1 settings and then knows the choke operating protocol to use. For example, one method of choke operation would be to crank the engine once with the choke off. If the engine did not start, then the choke would be put on for the second try. If the second try did not start the engine, the choke could again be left off, and so on for a number of cranking tries. After a set period (e.g. 90 seconds) without starting, the microcontroller ceases trying to start the engine and illuminates the GENERATOR FAULT LED on the transfer switch front panel to indicate to the operator that there is some problem.

If the engine does start and microcontroller 30 senses generator voltage, microcontroller 30 activates motor operator 35 to move switch 1 and switch 2 to the position where the generator is connected to the load in place of the utility power. As the motor operator is moved, microcontroller 30 senses the position of switch 1 and 2 from the Sense Switch Position switches 33 and 34. When microcontroller 30 senses that neither switch 1 or 2 is connected to the load, it ceases operation of the motor operator 35. The motor operator is left off for a set period to let any motors connected to the load wiring to spin down. This will prevent damaging voltage surges from occurring when the generator power is connected to the load. After the set delay, the microcontroller 30 resumes activation of the motor operator 35 thus connecting generator AC to the load. If sense switch position switches 33 & 34 indicate that switch 1 or switch 2 are still on after motor operator 35 has moved both switch 1 and switch 2 to the off position, microcontroller 30 does not move either switch 1 or switch 2 to the on position, but instead flashes all three of the ATS front panel LEDs to indicate to the operator that there is a problem with the ATS, possibly a welded contact in switch 1 or switch 2.

When utility power is restored, the process is reversed. If utility power remains restored for a set time (e.g. 1 minute), then microcontroller 30 communicates to microcontroller 12 to shut off the generator engine. Then microcontroller 30 activates the motor operator 35 to move switches 1 and 2 to reconnect the load to utility AC.

While in the AUTO mode, a periodic (e.g. once per 4 weeks) exercise of the system takes place. The microcontroller 30 notes the point at which the mode switch is last put into AUTO mode. The microcontroller maintains an internal counter that times out at the set periodic rate. At this timeout, the exercise test is launched.

The exercise program in microcontroller 30 starts the generator independently of the status of the utility AC voltage. If the generator starts, it is left to run for a set period (e.g. 10 minutes), after which the generator is shut off. If the generator did not start or generate voltage, after the set period of time (e.g. 90 seconds) the GENERATOR FAULT LED will light, and remain illuminated until the system is put in the OFF mode (which resets the LED).

During the exercise utility power remains connected to the load. If the utility power fails during the exercise, then the generator power is connected to the load for the duration of the utility power failure.

In the TEST mode, the system operates as follows. The generator is started as in the exercise in AUTO mode, but remains running while the mode switch is in the TEST position. Utility power remains connected to the load. If the generator does not start or generate voltage, the GENERATOR FAULT LED is lit. If the utility power fails during the TEST, then the generator power is connected to the load for the duration of the utility power failure, or as long as the mode switch remains in the TEST position.

Note that if switch 1 or switch 2 is physically shut off either by action of its own (optional) internal circuit breaker or by manual movement of the switch by a human operator, microcontroller 30 will be aware of this through the sense switch position circuits 33 and 34 and can then take corrective action to reset the switch by cycling the motor operator.

Battery charging and status sensing continues in all modes. If the battery status is sensed below normal, the BATTERY LOW LED is illuminated. The ALL OK LED is illuminated in AUTO mode if the last exercise was successful or if the mode switch was just put into AUTO mode and the first exercise has yet to be run. The ALL OK LED is lit in TEST mode if the generator starts and generates voltage.

While the invention has been particularly shown and described with reference to a particular embodiment thereof, it will be understood by those skilled in the art that various changes in form and detail may be made therein without departing from the spirit and scope of the invention.

I claim:

1. A system for automatically selecting and connecting one of two electrical supply sources to selected loads, said system comprising a transfer switch and an engine control,
    a) said transfer switch comprising:
        i) switches or circuit breakers capable of connecting one or the other of two electrical sources to selected loads;
        ii) a first operator for said switches or circuit breakers, said first operator capable of moving said switches or circuit breakers to their on and off states;
        iii) a mechanical interlock, said interlock capable of preventing said switches or circuit breakers from simultaneously connecting both of said electrical sources to said loads;
        iv) electrical sensors capable of sensing the presence or absence of power from said electrical sources and to said loads;
        v) a first microcontroller capable of controlling said first operator and communicating with said engine control based on input from said sensors;
        vi) a first program running in said first microcontroller providing overall system control of said transfer switch;
    b) said engine control comprising:
        i) relays for controlling the starting, stopping and running of an engine-driven electrical generator;
        ii) an electromechanical operator for connecting to and operating a mechanical choke on said engine;
        iii) a second microcontroller capable of controlling said relays and said electromechanical operator, and communicating with said transfer switch;
        vi) a second program running in said second microcontroller providing overall system control of said engine control.

2. A transfer switch according to claim 1 wherein said switches or circuit breakers comprise a pair of double-pole handle-operated molded case circuit breakers.

3. A transfer switch according to claim 1 wherein said first operator is a servo motor.

4. A transfer switch according to claim 1 wherein said mechanical interlock is incorporated into said first operator.

5. A transfer switch according to claim 1 wherein said engine control includes a battery charger function for the purpose of keeping said engine's starter battery in a frilly charged state.

6. A transfer switch according to claim 1 wherein the engine control is separately housed from said transfer switch.

7. A transfer switch according to claim 6 wherein said engine control communicates with said transfer switch via electronic serial communication.

8. A transfer switch according to claim 1 wherein said engine control is capable of controlling engines fueled by gasoline, LP/natural gas or diesel fuels.

9. A transfer switch according to claim 1 wherein a selector switch is incorporated into said engine control, said selector switch allowing selection of various modes of operation, including but not limited to selection of the type of engine connected to the engine control (gasoline, LP/natural gas, diesel).

10. A transfer switch according to claim 1 wherein said engine control includes a starter contactor capable of directly connecting to said engine's starter motor and battery, and connecting said battery to said starter on command from said engine control.

11. A transfer switch according to claim 1 wherein the physical position of said switches or circuit breakers is sensed by auxiliary switches mounted in said switches or circuit breakers and connected to said first microcontroller, said first microcontroller monitoring the output of said auxiliary switches as said first operator moves said switches or circuit breakers, said first microcontroller stopping said first operator if movement of said switches or circuit breakers by said operator is not matched by the output of said auxiliary switches, possibly indicating a problem with said switches or circuit breakers.

12. A transfer switch according to claim 1 wherein an automatic exercise function is included in said first program, said function causing said engine to start and run for a set period of time when a set period of clock time has elapsed.

13. A transfer switch according to claim 1 wherein said selected loads are connected to said transfer switch through a load subpanel or manual transfer switch.

14. A system for automatically selecting and connecting one of two electrical supply sources to selected loads, said system comprising a transfer switch and an engine control,
  a) said transfer switch comprising:
    i) switches or circuit breakers capable of connecting one or the other of two electrical sources to selected loads, said switches or circuit breakers comprising a pair of double-pole handle-operated molded case circuit breakers;
    ii) a first operator for said switches or circuit breakers, said first operator capable of moving said switches or circuit breakers to their on and off states, said first operator including a servo motor;
    iii) a mechanical interlock, said interlock capable of preventing said switches or circuit breakers from simultaneously connecting both electrical sources to said loads;
    iv) electrical sensors capable of sensing the presence or absence of power from said electrical sources and to said loads;
    v) a first microcontroller capable of controlling said first operator and communicating with said engine control based on input from said sensors;
    vi) an electrical interlock comprising auxiliary switches sensing the position of said switches or circuit breakers and reporting said position to said first microcontroller; said first microcontroller using said position information to sense faults in operation of said switches or circuit breakers;
    vii) a program running in said first microcontroller providing overall system control of said transfer switch;
  b) said engine control comprising:
    i) relays for controlling the starting, stopping and running of an engine-driven electrical generator;
    ii) an electromechanical operator for connecting to and operating a mechanical choke on said engine;
    iii) a battery charging function for keeping said engine's battery in a fully charged state;
    iii) a second microcontroller capable of providing overall system control of said engine control and communicating with said transfer switch;
    iv) a program running in said second microcontroller providing overall system control of said engine control.

* * * * *